(12) United States Patent
Stavrakis

(10) Patent No.: US 6,223,435 B1
(45) Date of Patent: May 1, 2001

(54) ONE-PIECE TIPLESS VALVE HOUSING

(76) Inventor: Demetrios Stavrakis, 801-A Hillstead Dr., Timonium, MD (US) 21093

( * ) Notice: Subject to any disclaimer, the term of this patent is extended or adjusted under 35 U.S.C. 154(b) by 0 days.

(21) Appl. No.: 09/232,029

(22) Filed: Jan. 15, 1999

Related U.S. Application Data

(60) Provisional application No. 60/108,618, filed on Nov. 16, 1998.

(51) Int. Cl.$^7$ ..................................................... B21K 1/20
(52) U.S. Cl. ................................ 29/890.128; 29/890.126; 29/558
(58) Field of Search ..................... 29/890.128, 890.126, 29/557, 558; 82/1.11; 251/356; 137/15

(56) References Cited

U.S. PATENT DOCUMENTS

| | | | |
|---|---|---|---|
| 2,147,243 | * | 2/1939 | Cornell, Jr. ..................... 29/890.126 |
| 3,710,466 | * | 1/1973 | Williamson et al. .................. 82/117 |
| 3,754,487 | * | 8/1973 | Nachtigal ............................. 82/1.11 |
| 3,823,628 | * | 7/1974 | Fortune ................................ 82/126 |
| 3,895,424 | * | 7/1975 | Hautau ................................. 82/124 |
| 4,868,969 | * | 9/1989 | Cerny ................................... 82/1.11 |
| 4,896,409 | * | 1/1990 | Rosch et al. ..................... 29/890.128 |
| 5,163,009 | * | 11/1992 | Yamane ................................ 82/129 |
| 5,974,920 | * | 11/1999 | Matsuo ................................ 82/1.11 |

* cited by examiner

Primary Examiner—I Cuda Rosenbaum
Assistant Examiner—Trinh Nguyen
(74) Attorney, Agent, or Firm—Law Offices of Royal W. Craig

(57) ABSTRACT

An improved design and process for manufacturing a valve housing for an existing filling machine. The improved design is an annular lip protruding downwardly at the outlet end and flaring outwardly for directing liquid into the container being filled, and a plurality of liquid discharge openings circumscribed by the annular lip at the outlet end for evenly dispersing liquid down and around the lip and against the sides of the container for accumulation therein without foaming. This design replaces existing press-fit tips which are expensive and unwieldy. Moreover, the above-described design facilitates formation of the entire valve housing from a single unitary piece of stainless bar stock, and the present invention encompasses the process for manufacture. This reduces manufacturing costs and eliminates weld lines and the associated risk of bacterial contamination.

4 Claims, 15 Drawing Sheets

ONE-PIECE TIPLESS VALVE HOUSING

CROSS-REFERENCE TO RELATED APPLICATIONS

The present application is based on U.S. provisional application serial No. 60/108,618 filed on Nov. 16, 1998.

BACKGROUND OF THE INVENTION

1. Field of the invention

The present invention relates to filling valves for use in counter-pressure filling machines and, in particular, to an improved tipless counter-pressure filling valve housing and process for weldless manufacturing of the same from one-piece stainless steel stock.

2. Description of the Background

Counter-pressure filling valves are typically used for filling of containers, such as cans or bottles, with carbonated liquids. Such valves ensure that the carbonated liquid which fills the can/bottle under pressure does not leak from the machine during filling or that the carbonation does not escape from the liquid as the container is filled.

Traditional methods and devices for filling containers with carbonated liquids include a variety of counter-pressure filling machines in which the cans/bottles are first filled with a gas under pressure. Carbonated liquid is then admitted to the cans/bottles under pressure so that the carbonated liquid cannot escape. The cans/bottles are then sealed to ensure that the carbonation does not escape the liquid.

One example of a filling valve for a carbonated liquid bottling machine is shown in U.S. Pat. No. 4,089,353 to Antonelli. The Antonelli '353 filling valve is controlled by a cam outside of the tank. The cam actuates a first valve member to admit counter-pressure gas into the can. The can is filled with the counter-pressure gas until the pressures of the gas and the liquid are equal. The cam then opens a second valve member which allows the liquid to flow into the container. When the container is filled, the cam actuator closes the valve members and the bottle is lowered away from the valve.

Another type of filling valve is illustrated by U.S. Pat. No. 4,679,603 to Rademacher et al. The Rademacher et al. '603 filling valve incorporates two concentric valve members. The outer valve member admits liquid into the container, and the inner valve member admits counter-pressure gas into the container. The outlet dispensing end or "vent tube" for the inner valve member must be inserted a certain distance into the container for proper operation of the filling valve.

Still another variation is shown in U.S. Pat. No. 5,156,200 to Mette, which discloses a counterpressure filling valve comprising a downwardly extendable sleeve which can descend toward an empty container below the valve, and which carries a deformable annular sealing element 2 which is movable into sealing engagement with the container to be filled.

The above and other commercially available counter-pressure filling devices employ valve housings that provide a high volume fluid interface between the filling equipment and cans or bottles to be filled. Each piece of filling equipment may employ a large number of valve housings to simultaneously fill an equal number of cans or bottles.

For instance, FIG. 1 is a perspective photo and FIG. 2 is a side-cross section of an existing counter-pressure filling valve housing of the type that is commercially available from Crown-Simplimatic Co. This valve and refinements thereto are described in detail in a family of patents, including U.S. Pat. Nos. 5,150,740; 5,145,008; 5,139,058; 4,986,318; 4,750,533; 4,442,873, all issued to Yun and all drawn to counterpressure filling valves for introducing counter-pressure gas and product into a container. The valves are actuated through the physical engagement of the container to be filled; thus, the filling operation is achieved without the use of external valve operating cams or the like.

As shown in FIGS. 1 and 2, the prior art valve body 10 generally includes a cylindrical mid-section 16, a port block section 11, and a valve cap section 13. A flange 12 atop mid-section 16 bears apertures 14 by which the fill valve body 10 is mounted to beverage machinery in a conventional fashion. A plurality of discharge nozzles 28 extend downward from valve cap section 13 and these typically define as few as nine and as many as fifteen discharge ports. The mid-section 16 is hollow such that beverage, such as a carbonated drink, selectively flows through. The hollow cylindrical mid-section 16 merges into an integral radially extending bottom flange 18 that leads into a downwardly directed annular collar 22. Collar 22 is angularly drilled and tapped at the nine to fifteen separate sites to define a plurality of axial channels through which the beverage flows out of the hollow mid-section 16. The lower surface 24 of the collar 22 accommodates interference fit insertion of a corresponding number of beverage discharge nozzle tips 26. Each nozzle tip 26 is in communication with one of the internal beverage passageways disposed in flange 18 and collar 22. Each tip 28 of the array is, thus, diagonally disposed in a downward and outward direction and internally comprises a single, angularly oriented, linearly extending central bore. The tips 28 collectively fit through the top opening at the upper lip or edge of a beverage can. The sizing and orientation of the array 26 of nozzle tips 28 discharges and directs beverage into the can in a plurality of circular streams against the interior surface of the side of the can near the top thereof. This minimizes foaming of the beverage.

The valve body 10 also comprises a central wall 30 with aperture 33 for introduction into the can of pressurized gas. Valve body 10 also comprises a separate, exteriorly disposed helical tube 34, the hollow of which functions to snift gas from the top of the before removing the can from the filling equipment. Tube 34 leads into a hollow through flange 18 and collar 22 and to a is port located adjacent the slot 36. In accordance with conventional operation, pressurized gas at the top of the can is evacuated or "snifted" just before the can is removed from the filling machinery.

Unfortunately, the above-described valve housing has a number of drawbacks. First, the filling valve tips 20 are formed from sections of stainless steel pipe that are compression-fit into the collar 22. This greatly complicates the manufacturing process as bore-holes must be drilled into the collar 22 and then each valve tip 28 must be press-fit by hand. The resulting valve housing is overly complex and expensive.

Moreover, the filling valve must have a relatively long stroke to meet the containers while ensuring that the valve tips 20 are inserted the proper depth in the container and that they are lifted clear from the container after the container is filled with the carbonated liquid. The requirement of moving the filling valves along this relatively long stroke significantly slows down the overall operation of stationary container filling machines.

The conventional process for manufacturing the above-described valve bodies also has shortcomings. The hollow cylindrical mid-section 16, valve cap 13, and port block 11 are separately machined from three individual pieces of stainless steel stock. These three components are then welded together to form the illustrated valve housing. Further machining takes place, e.g., to bore holes for valve tips 28, and the valve tips 28 are then press-fit by hand into the valve collar 22. This complex process was previously thought to be necessary due to the various intersecting channels in and through the valve body 10, plus the irregular protruding port block 11. However, the process is costly and greatly adds to the time it takes for the filling is valve housing to be manufactured. Even worse, the process results in several weld-lines 19. These weld-lines 19 are highly susceptible to the accumulation of liquid and increase the risk of contamination and disease.

U.S. Pat. No. 5,141,135 to Nish et al. shows a partial solution in the form of an adapter nozzle to eliminate the tips 28, and said adapter is shown in FIG. 3 herein. A portion of the valve body including the tips 28 must be removed, and then the adapter nozzle is fastened to the non-removed portion. The adapter discharges fluid in three broad thin streams angularly against the interior walls of the can. While the tips are eliminated, the adapter approach raises problems of its own. The tips must be machined off smoothly and the adapter attached securely to ensure proper operation. Even so, the adapter is yet another welded part that further compromises structural integrity.

It would be greatly advantageous to develop a simpler and more cost effective valve housing and manufacturing process therefor which eliminates both welding and valve tips.

SUMMARY OF THE INVENTION

It is, therefore, an object of the present invention to provide an improved tipless counter-pressure filling valve housing with a shorter stroke to meet the containers while ensuring proper filling with carbonated liquid.

It is another object to provide a tipless counter-pressure filling valve housing to reduce labor, manufacturing and raw materials costs associated with the press-fit tips.

It is another object to simplify the process for manufacturing valve bodies using a single is stainless steel blank, rather than separately machining from three individual pieces of stainless.

It is still another process to eliminate all weld-lines, thereby dramatically increasing structural integrity and reducing the risk of bacterial contamination and disease.

These and other objects are accomplished by an improvement to a conventional valve housing. The conventional valve housing is of the type having a valve body with an upward flange for attachment to an existing filling machine, and an outlet end from which liquid is dispensed into a container. The valve body defines a central liquid reservoir for passing liquid from the filling machine into the container, and a central gas tube traverses the liquid reservoir from the inlet end to the outlet end of the valve housing. Normally, filling tips are press fit into the outlet end to direct fluid into the container. The improvement here comprises an annular lip protruding downwardly at the outlet end and flaring outwardly for directing liquid into the container being filled, and a plurality of liquid discharge openings circumscribed by the annular lip at the outlet end for evenly dispersing liquid down and around the lip and against the sides of the container for accumulation therein without foaming.

The above-described design facilitates formation of the entire valve housing from a single unitary piece of stainless bar stock.

The process for manufacturing the valve housing from a single piece of stock is also disclosed, and this includes the following nine primary steps which combine to eliminate the need for separate machining and welding together of the cylindrical mid-section, port block section, and valve cap section as previously necessary with prior art valve bodies. The process includes a first exterior lathing step in which a solid cylindrical stainless bar stock is lathed to form an annular channel leaving a round lower mass of sufficient diameter to form port blocks, a second drilling step to form the reservoir and upwardly protruding neck, a third step to drill a passage through the neck, a fourth step to lathe four annular tiers subdividing the bottom mass, a fifth step by which the external dimensions of the valve and port block section are defined, a sixth drilling step to port blocks which results in pre-drilling and threading, a seventh step to complete the flange 4, an eighth step to complete the outlet end by champfering the lip and machining oblong liquid discharge outlets, and finally, a ninth step to complete the valve housing by adding two stainless tubes.

BRIEF DESCRIPTION OF THE DRAWINGS

FIG. 9 is a perspective view of a unitary blank of conventional stainless steel bar stock.

FIG. 10 is a side-cross sectional drawing with major dimensions to illustrate the first operation, e.g., a lathing operation to define the general external extent of the valve body 10.

FIG. 11 is a side-cross sectional drawing with major dimensions to illustrate the second operation, which is a boring operation to define channel 14.

FIG. 12 is a side-cross sectional drawing with major dimensions to illustrate the third step, which is another boring operation to drill neck 10.

FIG. 13 is a side-cross sectional drawing with major dimensions to illustrate the fourth step, which is further lathing around the bottom of valve body 2 to form four annular tiers subdividing the bottom.

FIGS. 14 and 15 are side perspective drawings showing the fifth step in which the lathed tiers at the bottom of valve body 2 are machined to form the port block section 11.

FIG. 16 is a side cross-sectional drawing showing the sixth step which is a drilling sequence to port block section 11.

FIG. 17 is a top perspective drawing showing the seventh step which is the machining of football-shaped flange 4.

FIG. 18 is a bottom perspective drawing with dimensions illustrating the eighth step in which the four oblong liquid discharge outlets 16 are machined.

FIG. 19 is a side cross-section of the completed valve housing 2 illustrating a ninth step entailing the addition of the stainless tube 8 by press-fitting into the pre-drilled flange 4 and welding at the other end to the side-aperture 43 in port block 6.

DETAILED DESCRIPTION OF THE PREFERRED EMBODIMENTS

Figure 1:
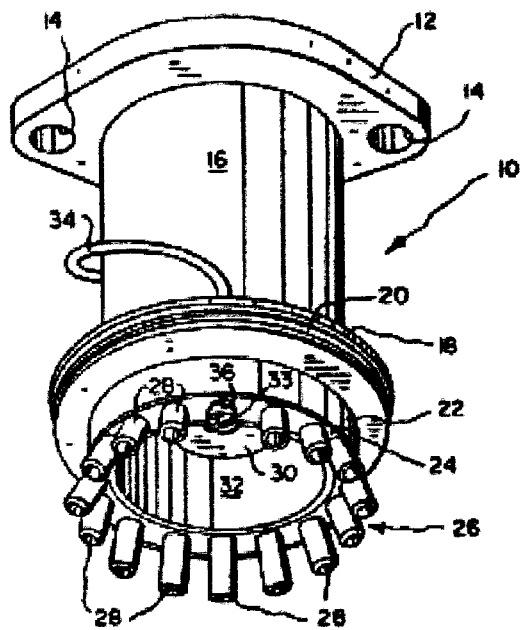
FIG. 1 is a perspective view of an existing counter-pressure filling valve body of the type that is commercially available from Crown-Simplimatic Co.
Figure 2:
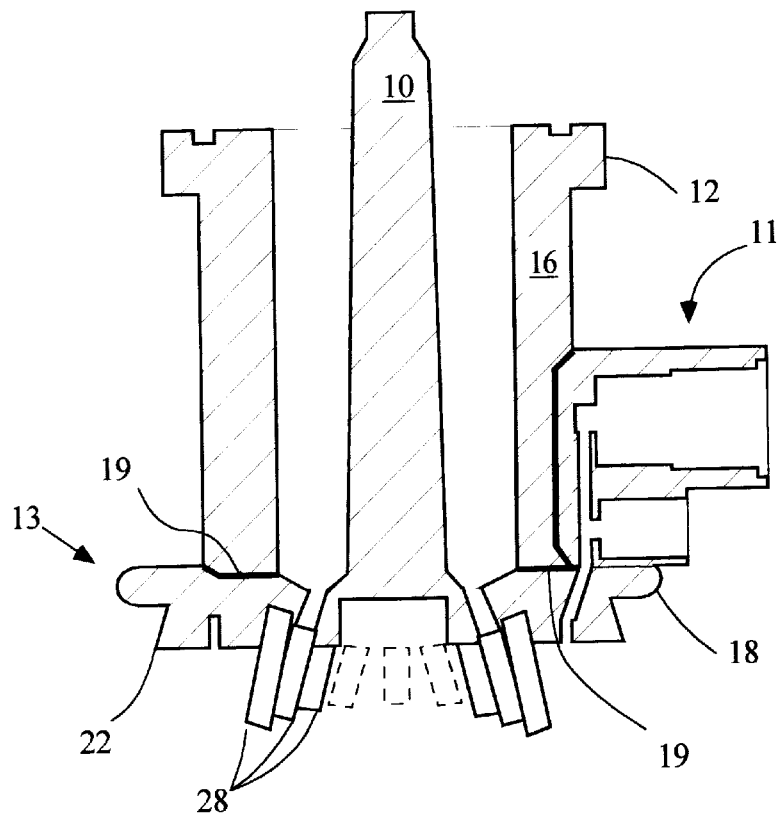
FIG. 2 is a side cross-section of the prior-art counter-pressure filling valve of FIG. 1.
Figure 3:
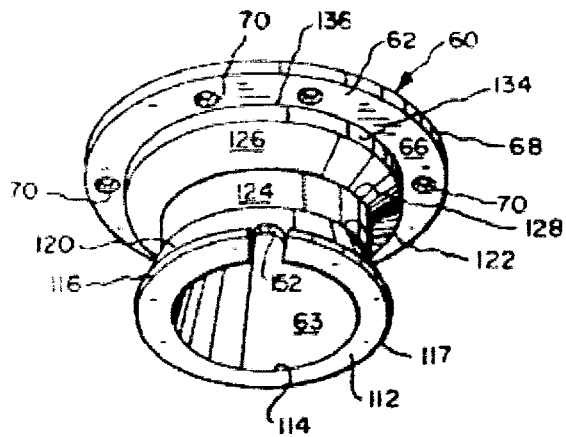
FIG. 3 is a perspective view of a prior art adapter for eliminating tips as set forth in U.S. Pat. No. 5,141,135 to Nish et al.

As described above, FIGS. 1 and 2 show a prior art valve body 10 that generally includes a cylindrical mid-section 16, a port block section 11, and a valve cap section 13. The hollow cylindrical mid-section 16 merges into an integral radially extending bottom flange 18 that leads into a downwardly directed annular collar 22. Collar 22 is angularly drilled and tapped to define a plurality of axial channels through which the beverage flows out of the hollow mid-section 16. A discharge tip 28 is press-fit into each of the channels in the lower surface 24 of the collar 22. The sizing and orientation of the nozzle tips 28 discharges and directs beverage into the can with the intent to minimizes foaming of the beverage. The manufacturing process is complex and results in an expensive end product. Moreover, weld lines 19 leave the valve body 10 more susceptible to breakage and/or bacterial contamination.

The improved valve design and process according to the present invention provides for the weldless manufacture of a improved valve housing for the same purpose, the new valve housing eliminating all welding and valve tips as described above.

Figure 4:
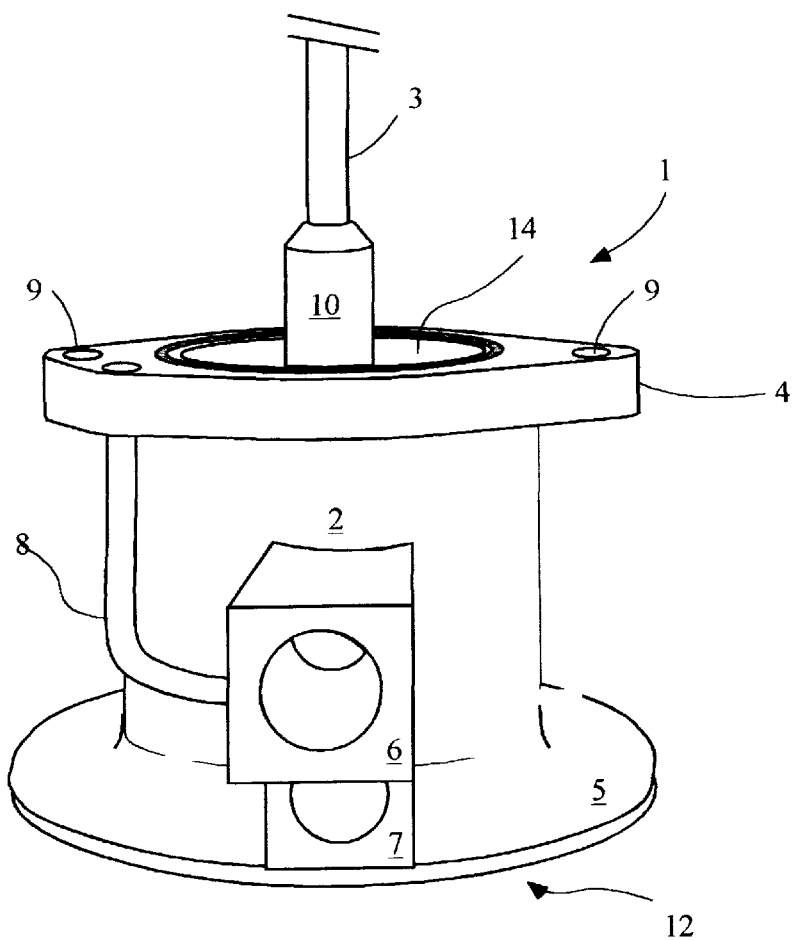
FIGS. 4 and 5 are front and side perspective views of the one-piece tipless filling valve housing 1, respectively, according to the present invention.
Figure 5:
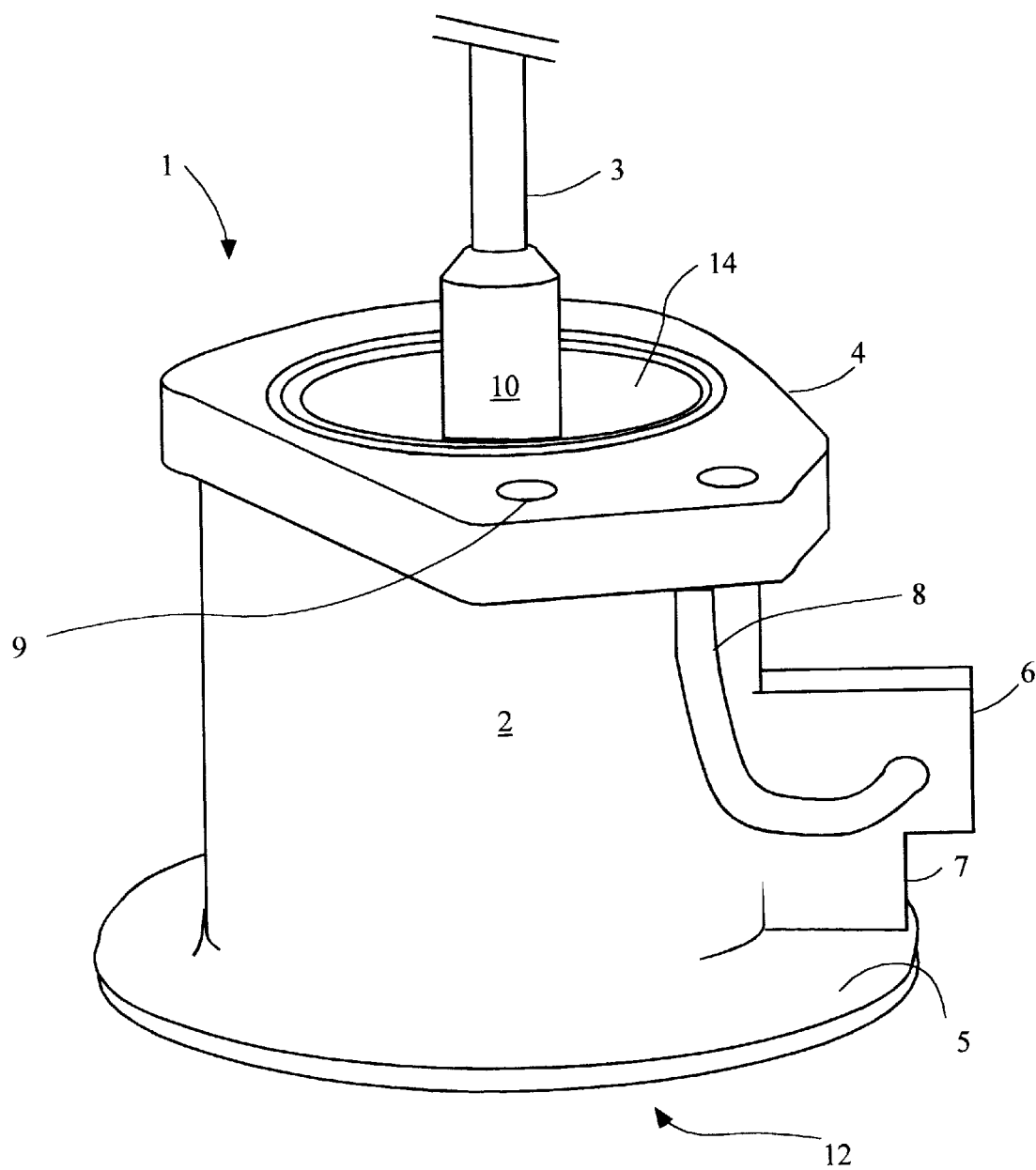
Figure 6:
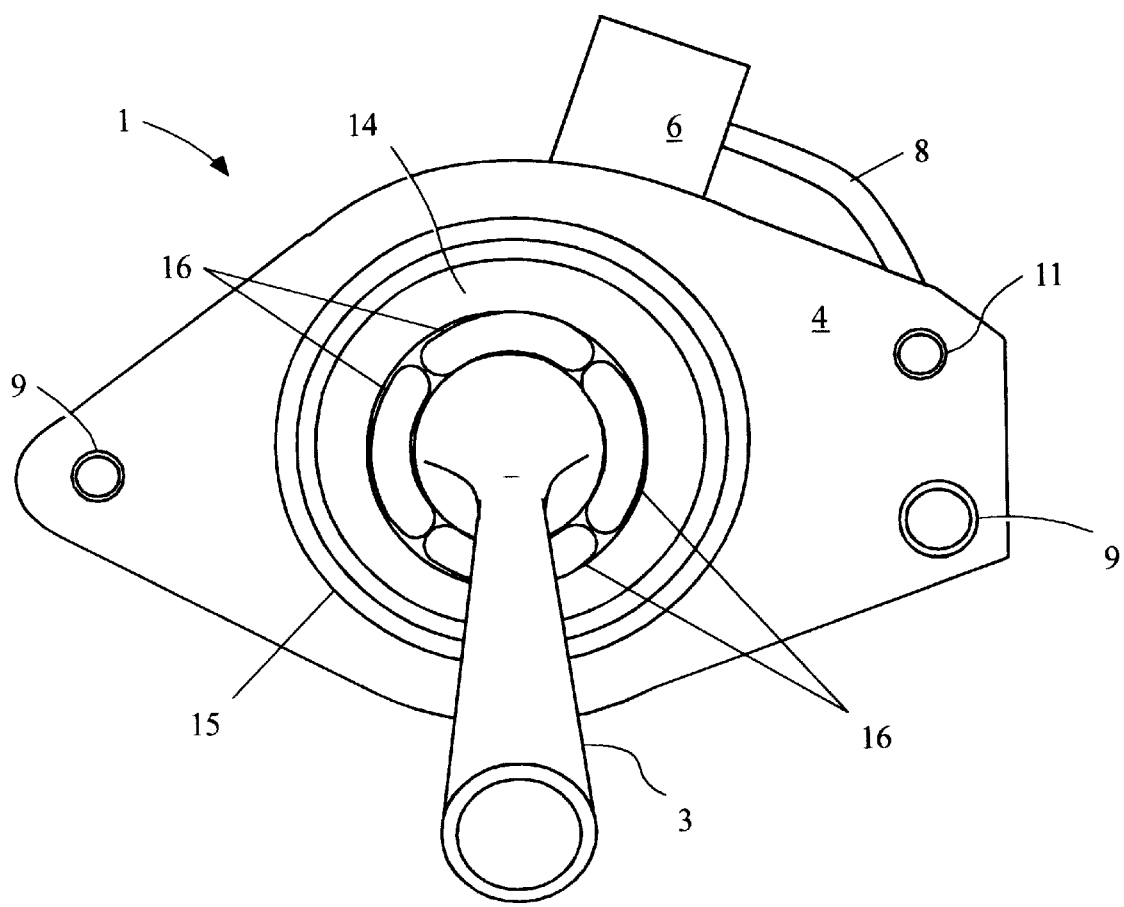
FIG. 6 is a top perspective view of the one-piece tipless valve housing 1 as in FIGS. 4–5.

FIGS. 4 and 5 are front and side perspective views of the one-piece tipless filling valve housing 1, respectively, according to the present invention. As shown in FIGS. 4–6, filling valve housing 1 includes an upwardly protruding filling tube/neck 10 that supports a press-fit pipe 3 that is maintained in fluid communication with a counter-pressure gas supply of the filling machine. The counter pressure gas supply is kept at elevated pressure, typically nitrogen or carbon dioxide at 40–45 psi.

Filling valve housing I also includes a valve body 2 having an outlet end 12 from which the carbonated liquid is dispensed to a container. The outlet end 12 is provided with a downwardly curled annular lip 5 having internal screw threads for engaging various conventional bell housings. Each bell housing is typically adapted for receiving a particular type of container.

Filling valve housing 1 is upwardly attached to the filling machine by an integral flange 4, and a pair of bore-holes 9 (not threaded) to allow screw-attachment by flange 4 to the filling machine.

The press-fit pipe 3 enters the neck 10 and valve body 2 centrally through an aperture that defines a filling reservoir 14. Filling reservoir 14 is maintained in fluid communication with the liquid reservoir of the filling machine, and press-fit pipe 3 extends to a point above the level of liquid in reservoir 14. The pipe 3 permits the flow of counter pressure gas through reservoir 14.

Adjacent coupling blocks 6 and 7 protrude laterally from the side of valve body 2, and both provide screw-threaded ports to the interior of valve housing 1. In typical operation of a counter-pressure filling machine, coupling block 6 provides a screw-interface for an external snift valve that serves to monitor and release counter-pressure gas from the top of the can after the can has been filled with carbonated liquid. A stainless tube 8 leads from the interior of port 6 to flange 4 to provide a fluid coupling with the filling machine.

Coupling block 7 is also centrally bored and threaded for coupling to an external clean-in-place valve that is actuated to allow cleaning fluid to course through the valve housing 1, thereby accomplishing a cleaning operation to kill bacteria in the filling machine.

FIG. 6 is a top perspective view of the one-piece tipless valve housing 1 as in FIGS. 4–5. The filling reservoir 14 in valve body 2 defines a central passage around the compressed gas tube 3 for dispensing of carbonated liquid. The liquid is dispensed through discharge openings 16 as seen at the bottom of reservoir 14. Discharge openings 16 comprise four liquid outlets that are evenly disposed about the neck 10 of the compressed gas tube. Each discharge opening 16 is an oblong aperture spaced radially around the neck 10 at the bottom of reservoir 14. The margin of flange 4 surrounding the filling reservoir 14 is recessed by a channel 15 sized to seat a rubber O-ring seal for a fluid-tight coupling with the filling equipment.

Figure 7:
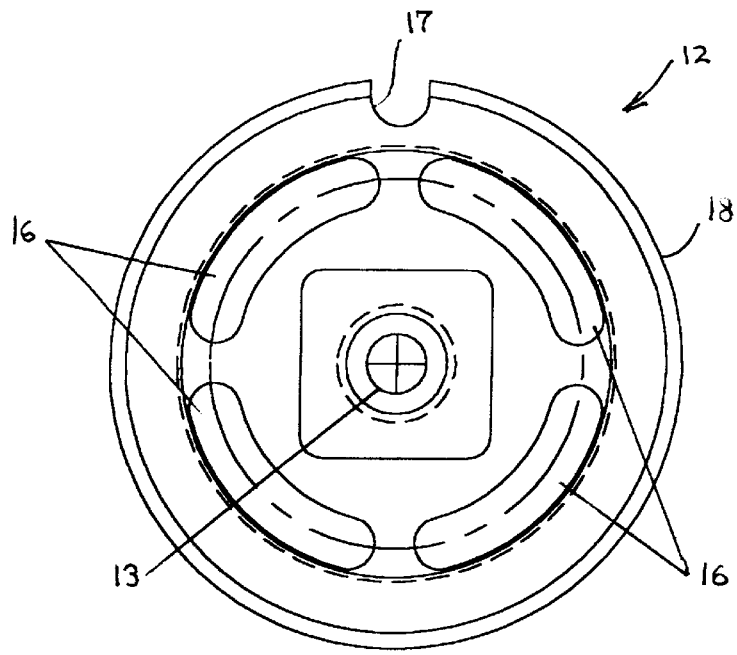
FIG. 7 is a perspective view of the outlet end 12 of the one-piece tipless valve body 1 according to the present invention.

FIG. 7 is a perspective view of the outlet end 12 of the one-piece tipless valve body 1 according to the present invention. The discharge openings 16 are surrounded by a frustro-conical annular lip 18 that protrudes downwardly and flares outwardly for directing liquid into the can being filled. The four liquid discharge openings 16 are evenly disposed about a gas discharge aperture 13 (which leads downward from gas discharge tube 3) just inside the lip 18. Pressurized gas is admitted to the can through gas discharge tube 3 and gas discharge aperture 13. Once pressurized and filled with beverage, snifting of gas from the top of the can occurs via a small notch 17 which is machined in the frustro-conical lip 18.

Figure 8:
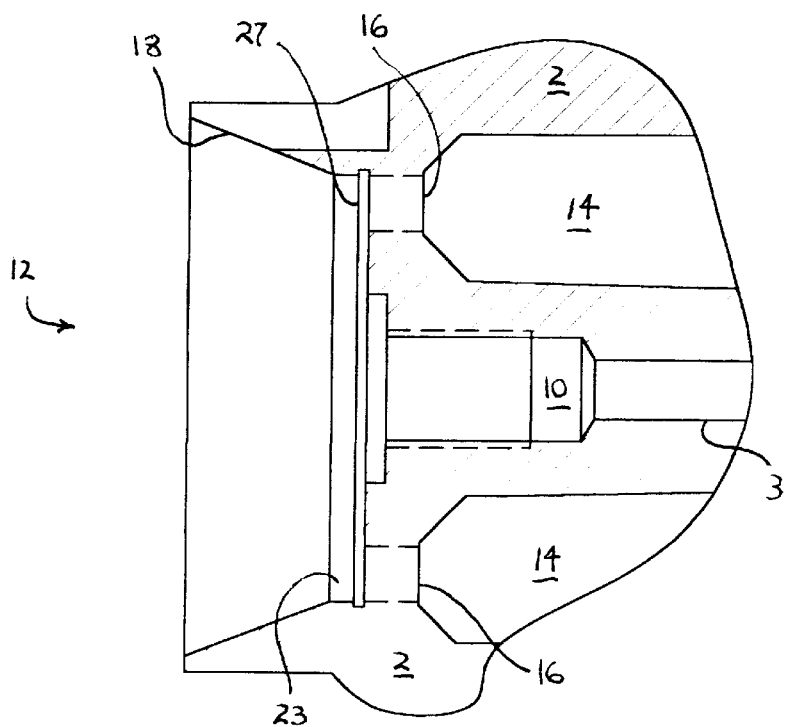
FIG. 8 is a cross-section of the outlet end 12 of the one-piece tipless valve body 1 as in FIG. 7.

FIG. 8 is a cross-section of the outlet end 12 of the one-piece tipless valve body 1 as in FIG. 7. With comparative reference back to the prior art valve body of FIGS. 1 and 2, the prior art valve incorporates a plurality of press fit tips 10. Each tip 10 is a section of stainless pipe, and tips 10 are arranged to protrude downwardly by various lengths. Each tip 10 is fit into a bore-hole that must be drilled into the bottom of valve cap 2. Tips 10 help to reduce foaming of the carbonated liquid. This is because the liquid is evenly dispersed at equal flow-rates through the multiple tips 10, and tips 10 direct the liquid streams outward against the sides of the can for gentler accumulation therein. The present tipless valve housing 1 achieves the same benefit without the need for press-fit tips 10. This is accomplished by the combination of the four oblong liquid discharge outlets 16 and frustro-conical lip 18, the liquid discharge outlets 16 serving to evenly disperse liquid down and around the margins of lip 18 and into the can being filled. The inner hollow 14 of valve mid-section 2 is constricted toward the outlet end 12, and the four oblong liquid discharge outlets 16 flow outward from the constricted inner hollow 14 through a cylindrical aperture 23 and into the recess formed by the frustro-conical lip 18. The cylindrical aperture 23 is formed with a peripheral channel to seat a circular mesh filter screen 27. Screen 27 can be inserted through the recess formed by the frustro-conical lip 18 and can be press-fit into the peripheral channel in aperture 23.

Given the above-described configuration, carbonated liquid flows smoothly down the lip 18 and against the sides of the can for gentler accumulation therein. Moreover, the liquid discharge outlets 16 and lip 18 can be integrally formed during machining of the one-piece tipless valve housing 1. Thus, all welding and press-fitting operations are eliminated as will be described.

FIGS. 9–19 illustrate the respective stages of the machining process of the one-piece tipless valve housing 1.

Figure 9:
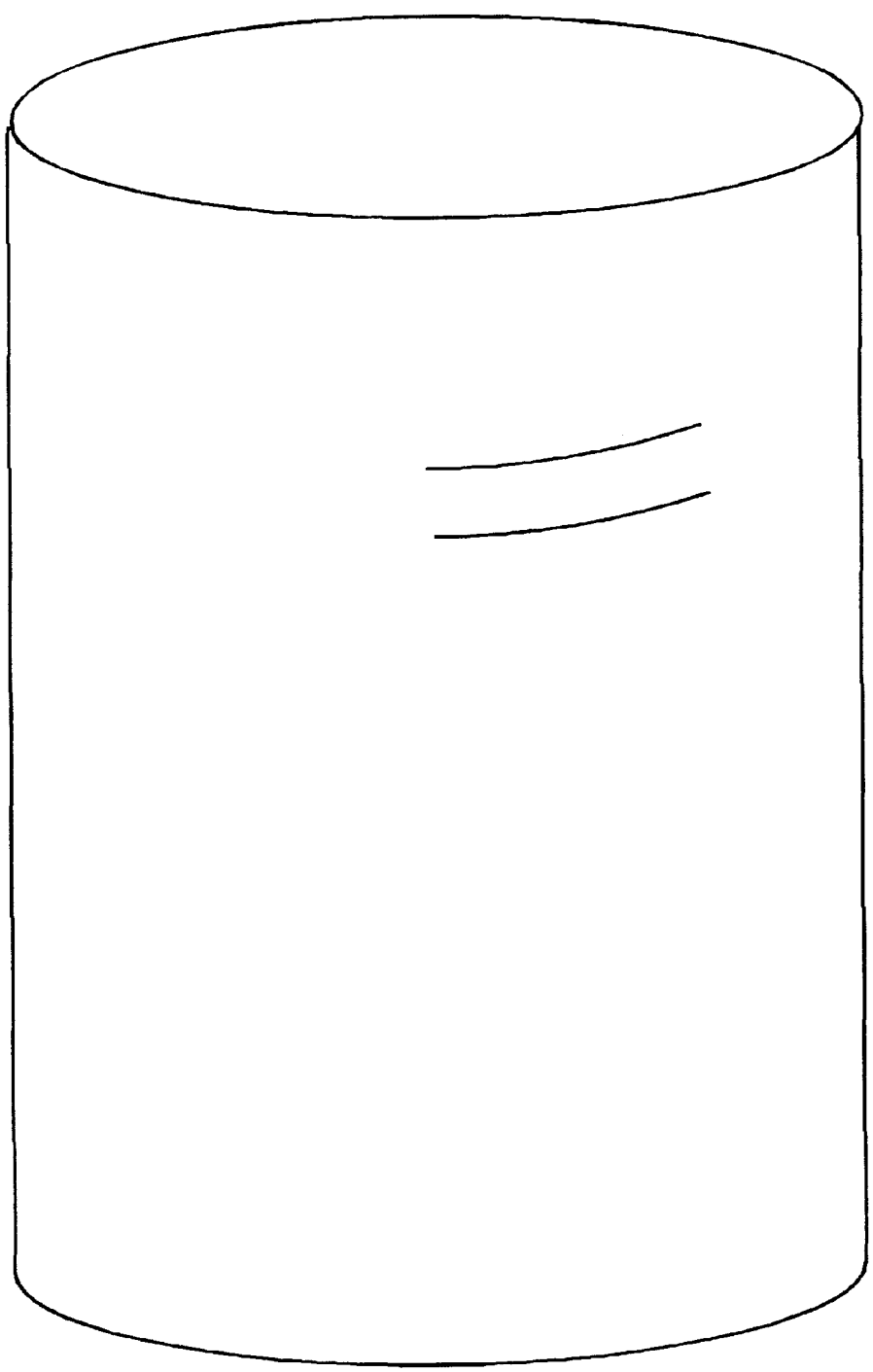
FIGS. 9–19 illustrate the respective stages of the machining process of the one-piece tipless valve housing 1.

As shown in FIG. 9, the process begins with a unitary blank of conventional stainless steel bar stock.

Figure 10:
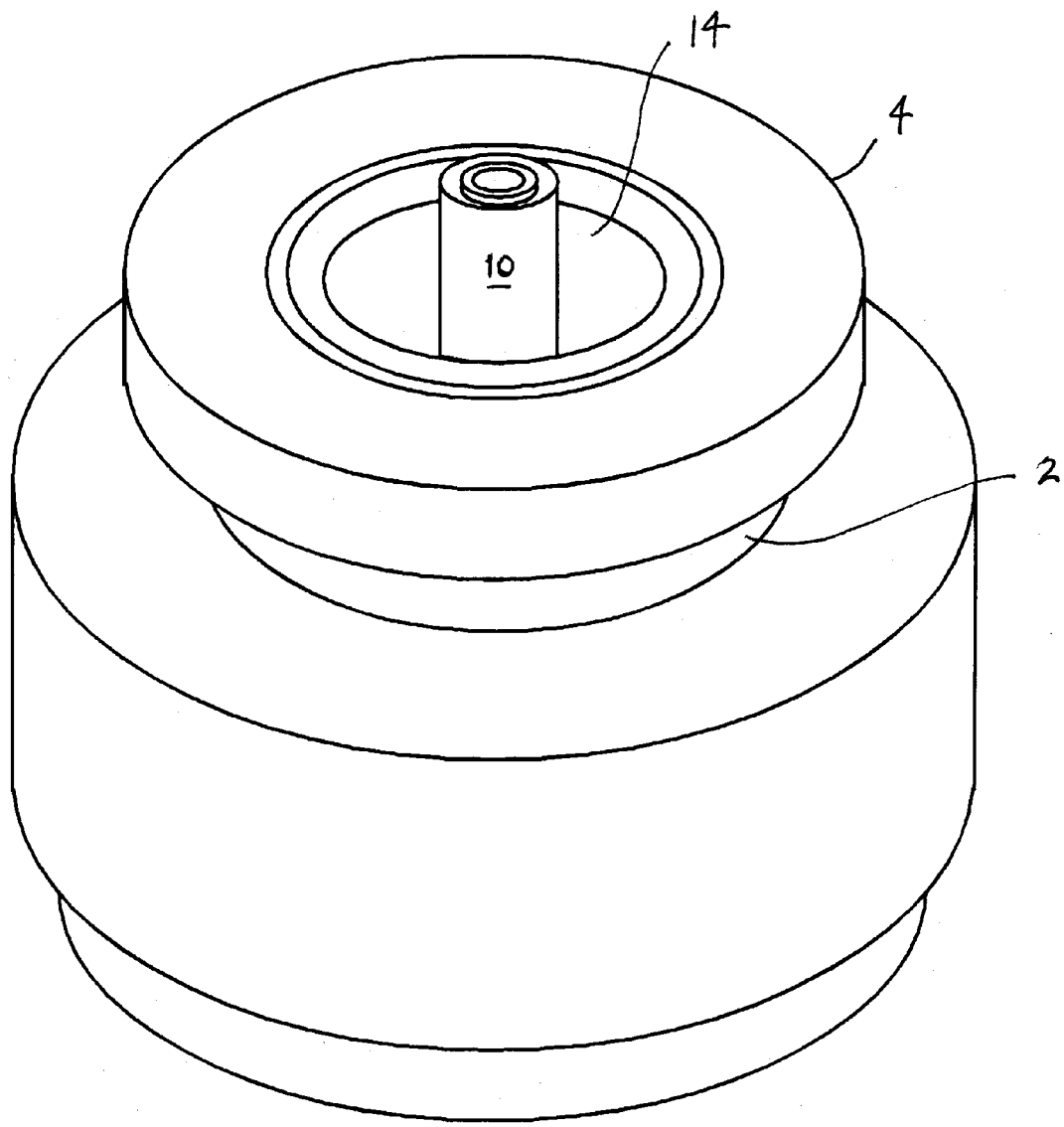

As shown in FIG. 10, the initial step is a lathing operation to define the general external extent of the valve body 10. The lathing operation is preferably accomplished on a CNC lathe such as, for instance, a Hitachi Seiki Hitec-turn 20 CNC lathe or commercial equivalent. Lathing is completed such that the general external extent of the valve body 10 encompasses all three valve body sections that were traditionally welded together during later processing, namely, the mid-section, port block section and valve cap section. More specifically, the blank is lathed from the top to leave a short length of upwardly protruding neck 19 of approximately 0.314–0.343" diameter to support the press-fit gas discharge tube 3. This is stepped into a 3.874" diameter round upper collar 24 (upper collar 24 later becomes flange 4), which in turn is stepped to a 1.042 inch wide by 0.875 inch deep channel 28 that is lathed into the stock adjacent the round upper collar 24. Channel 28 is stepped to a large round lower mass 26 of sufficient diameter to form port blocks 6 and 7, and lower mass 28 is stepped to a smaller round lower mass 29 of sufficient diameter to form the frustro-conical lip 18 at the outlet end 12.

Figure 11:
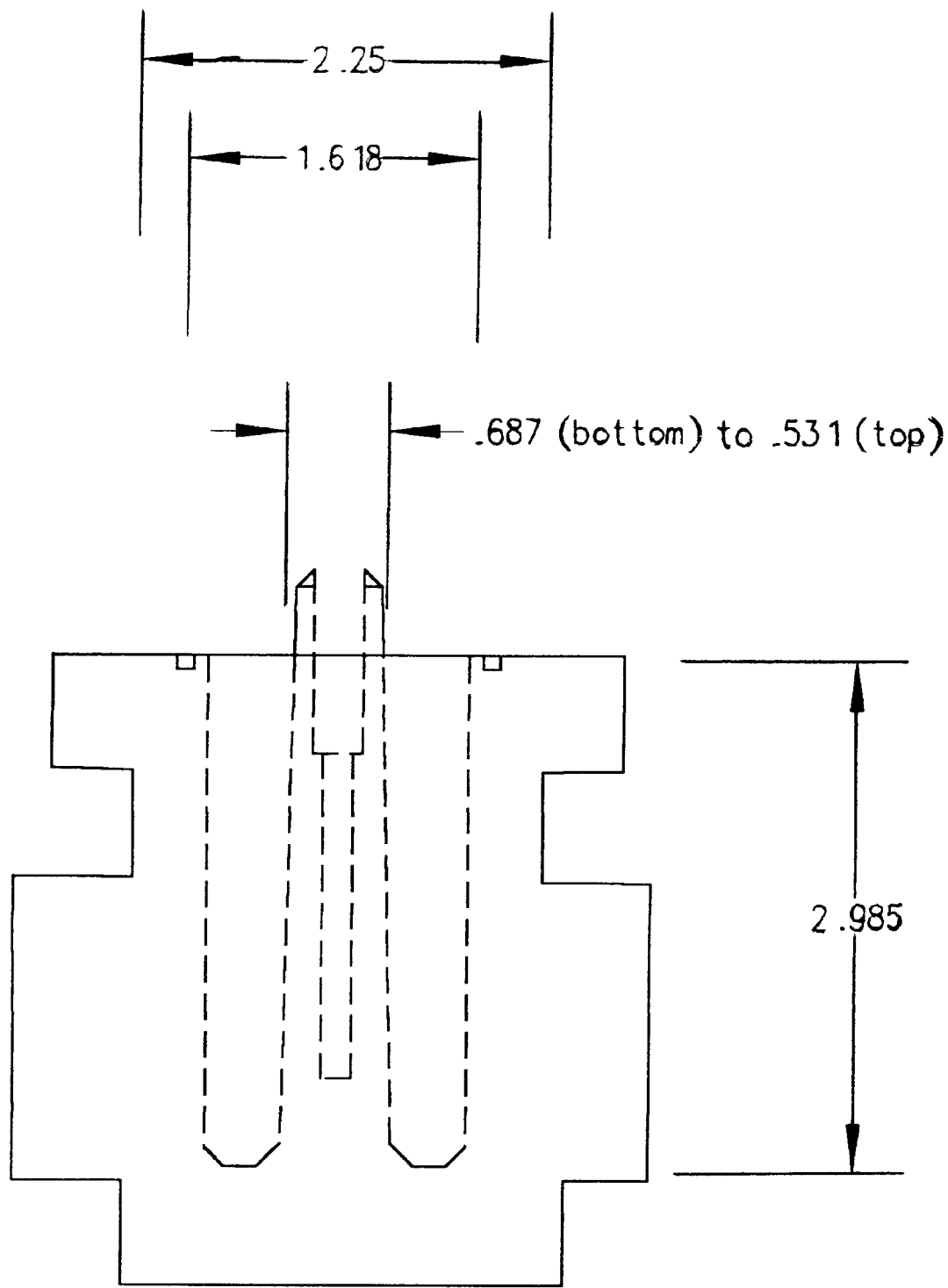

FIG. 11 is a side-cross sectional drawing with major dimensions to illustrate the second operation, which is a boring operation from the top to form reservoir 14 and to define the extent of the neck 19 for gas discharge tube 3 which protrudes coaxially upward through the center of reservoir 14. As shown, the neck 19 for gas discharge tube 3 is tapered from top to bottom from approximately 0.312–0.314" in diameter. A valve seat channel 38 is also machined as shown around reservoir 14.

Figure 12:
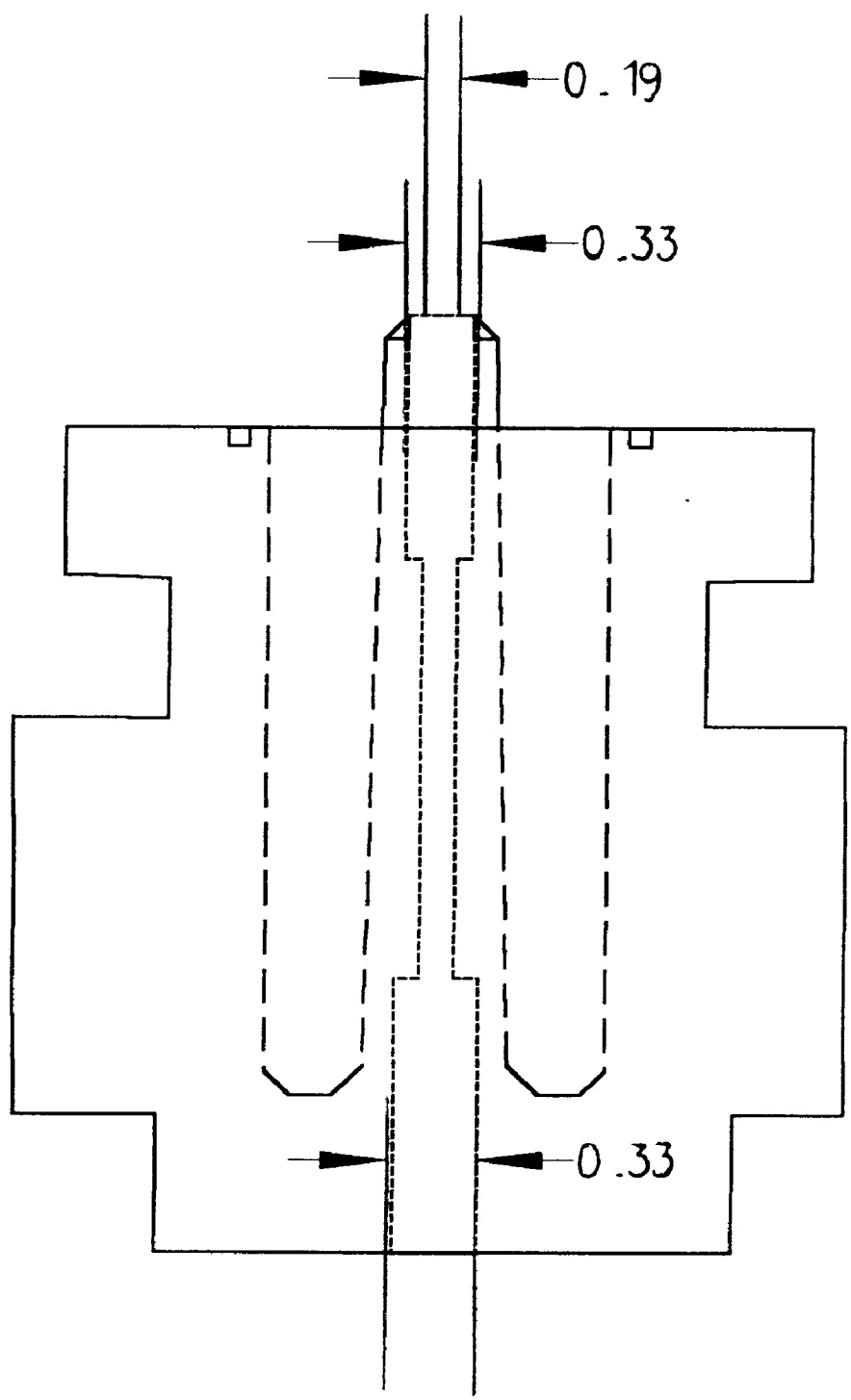

FIG. 12 is a side-cross sectional drawing with major dimensions to illustrate the third step, which is another boring operation to form the gas passage through neck 10. This includes the boring of a constricted 0.10" central passage completely through the neck 10 and entire valve body 2, followed by opening both ends with an approximate 0.33" bore leading into both the top and the bottom.

Figure 13:
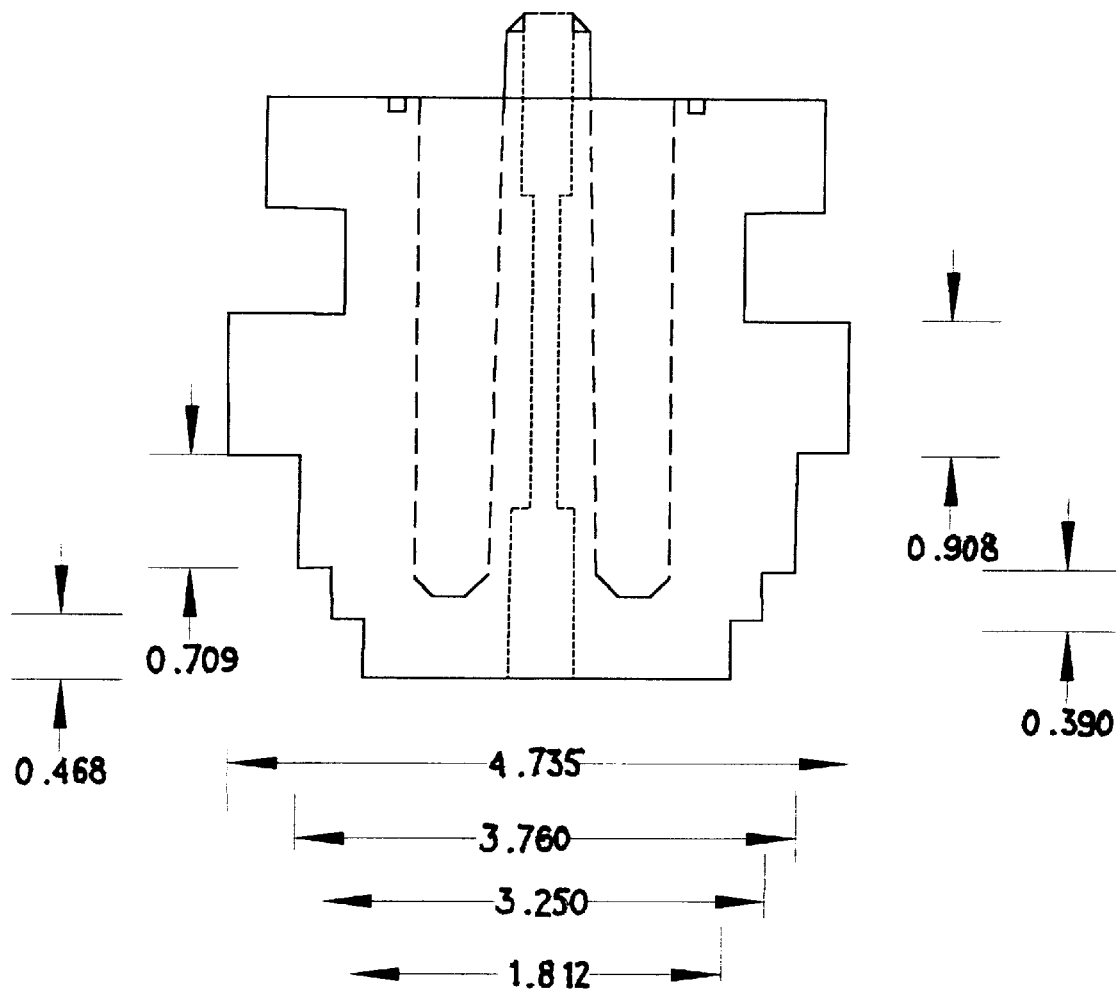

As seen in FIG. 13, further lathing takes place around the bottom of valve body 2 to form four annular tiers subdividing the bottom. The bottom of valve body 2 is lathed to form a larger diameter section 42, a smaller diameter section 44, a still lower and smaller diameter section 46, and a lowest and smallest diameter section 48. The respective diameters and vertical extent of each tier should be approximately 4.735 inches by 0.908 inches for the larger diameter section 42, 3.760 inches by 0.709 inches for the diameter of section 44, 3.250 inches by 0.390 inches for the diameter of section 46, and 1.812 inches by 0.468 inches for the lowest and smallest diameter section 48.

Figure 14:
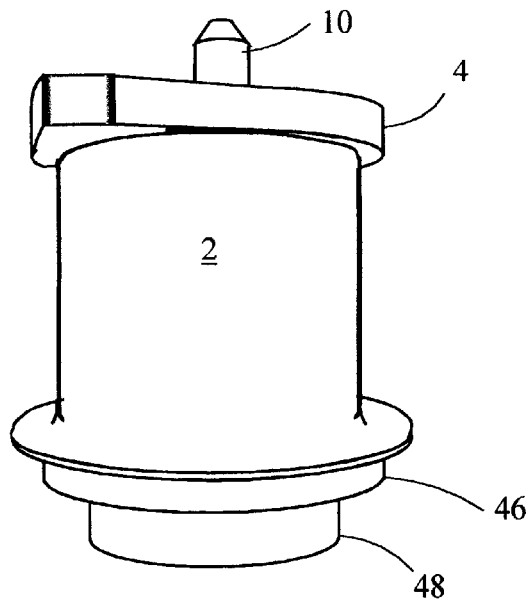
Figure 15:
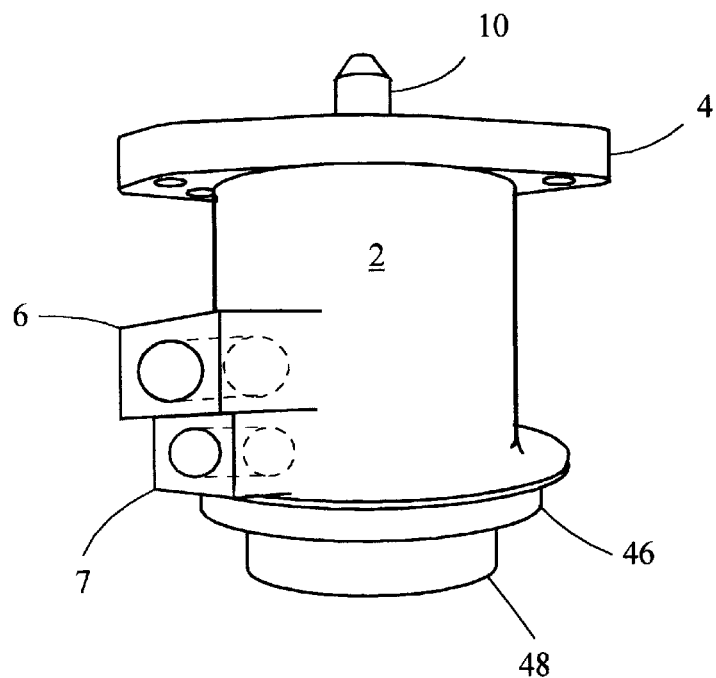

As seen in FIGS. 14 and 15, the lathed tiers at the bottom of valve body 2 are then machined to form the port block section 11. Specifically, the larger diameter tier 42 is machined around approximately 330 degrees to leave a rectangular 0.890" by 0.930" by 1.209" outward protrusion for port block 6. Likewise, approximately 330 degrees of tier 44 is machined off to leave a rectangular 0.890" by 0.725" by 0.709" outward protrusion for port block 7, the two port blocks 6, 7 being contiguous. This machining is preferably accomplished with a CNC Machining Station such as, for instance, a commercially available 4 Axis CNC Vertical Machining Center (50 hp) for 60"×120"×40" tooling, castings and weldments.

Figure 16:
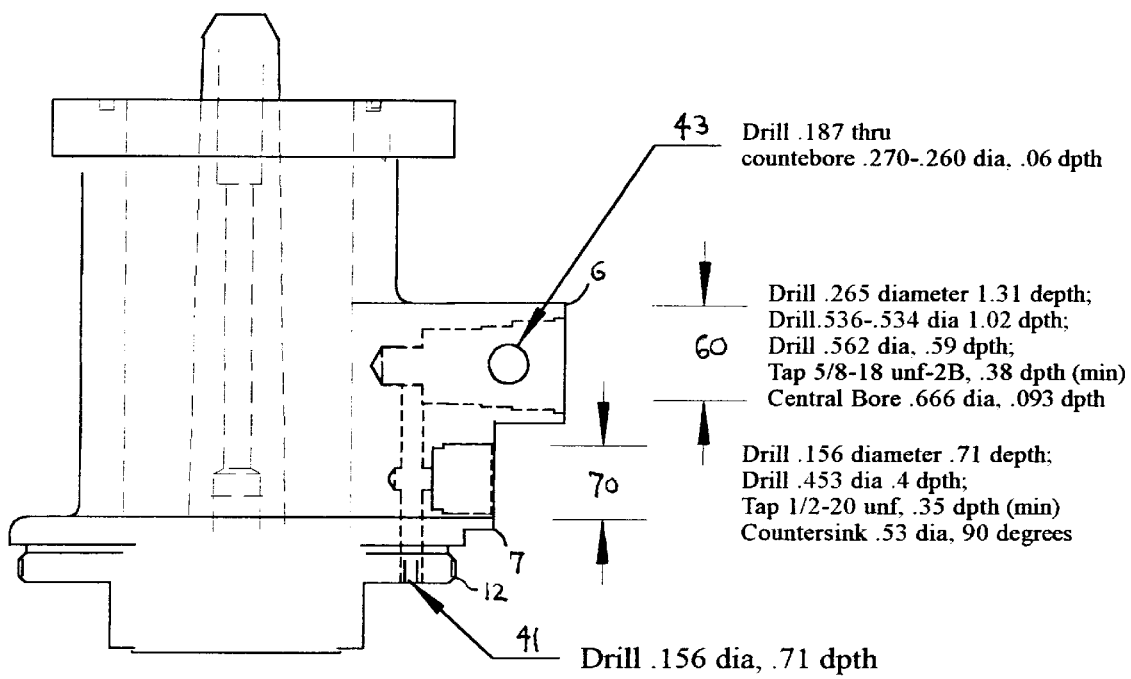

FIG. 16 is a side cross-sectional drawing of port block section 11 with the respective port blocks 6, 7 shown inclusive of drilling sequence and dimensions to illustrate how a threaded outlet port hole 60 and a threaded outlet port hole 70 are bored into the respective port blocks 6, 7 to form couplings for the filling machine. Both of port holes 60 and 70 are provided with valve seats to ensure a fluid-tight seal, and outlet port hole 60 is formed with a 0.265" inner terminus while outlet port hole 70 is formed with a 0.156" inner terminus. A 0.1580" diameter coaxial bore 41 (shown in dotted lines) is then made from the bottom of lower flange 12 straight upward and through the inner terminus of both bore holes 60, 70 to connect the two pre-drilled port blocks 6, 7. A side-aperture 43 is drilled into port block 6 to connect stainless tube 8. After the port blocks 6, 7 are formed, the round upper collar 24 is machined to form the football-shaped flange 4.

Figure 17:
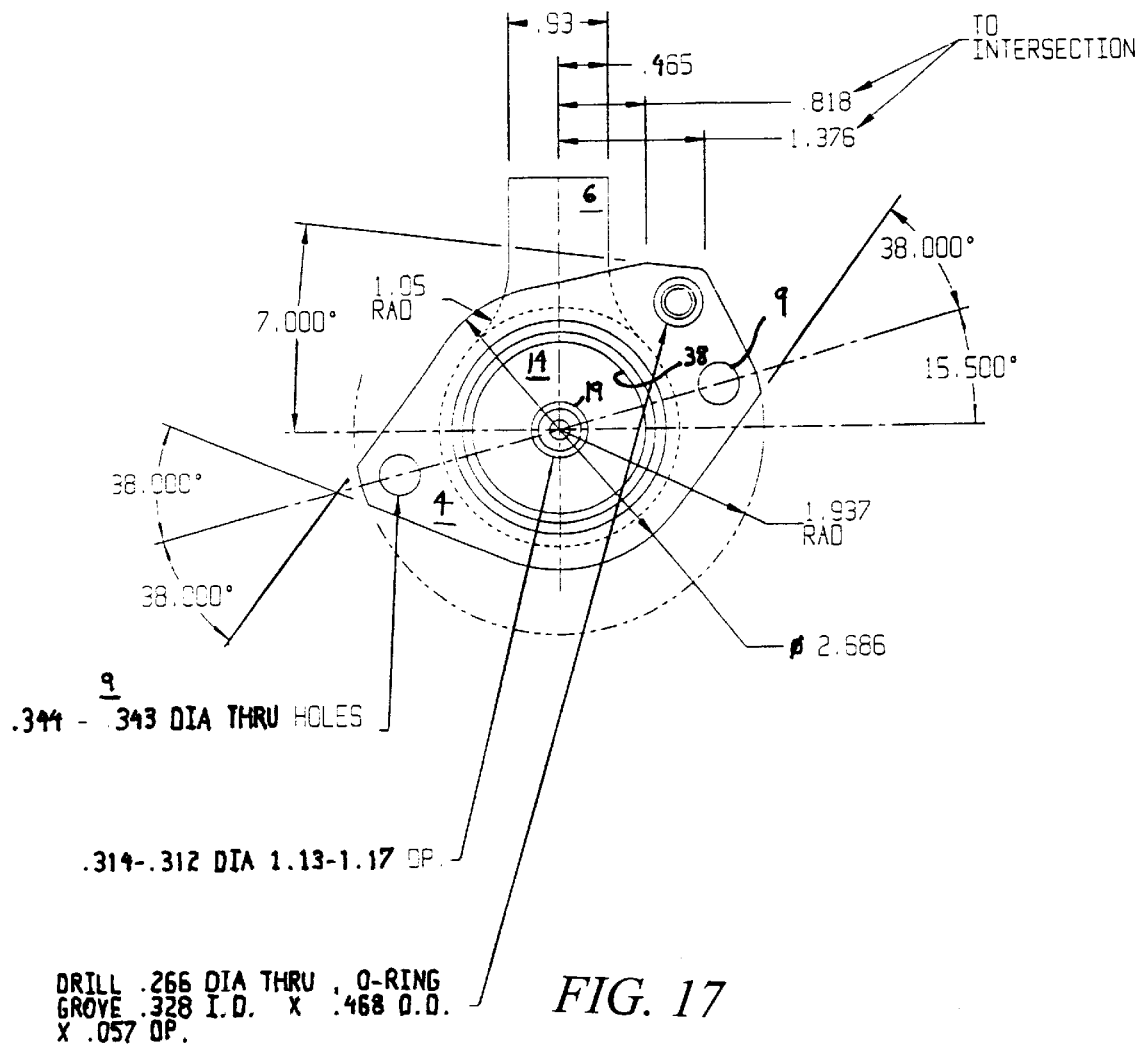

FIG. 17 is a top perspective drawing showing major dimensions to illustrate the machining of football-shaped flange 4. The flange 4 is machined as shown around its periphery to provide a multi-featured irregularly-shaped profile, contour milled in accordance with the specifications shown in FIG. 17. A pair of non-threaded bore-holes 9 are then drilled through the opposing ears of flange 4 to allow screw-attachment via flange 4 to the filling machine. The third non-threaded bore-hole 11 is drilled in one ear of flange 4 to allow attachment at flange 4 of the stainless tube 8 which leads from the interior of port 6 to flange 4 to provide a fluid coupling with the filling machine. Bore-hole 11 is provided with an O-ring groove as shown to ensure a fluid-tight seal. The lowest and smallest diameter tier section 48 is lathed at the bottom to form annular lip 18. Finally, the four oblong liquid discharge outlets 16 are machined into the bottom of the valve body 2 to evenly disperse liquid down and around the margins of lip 18.

Figure 18:
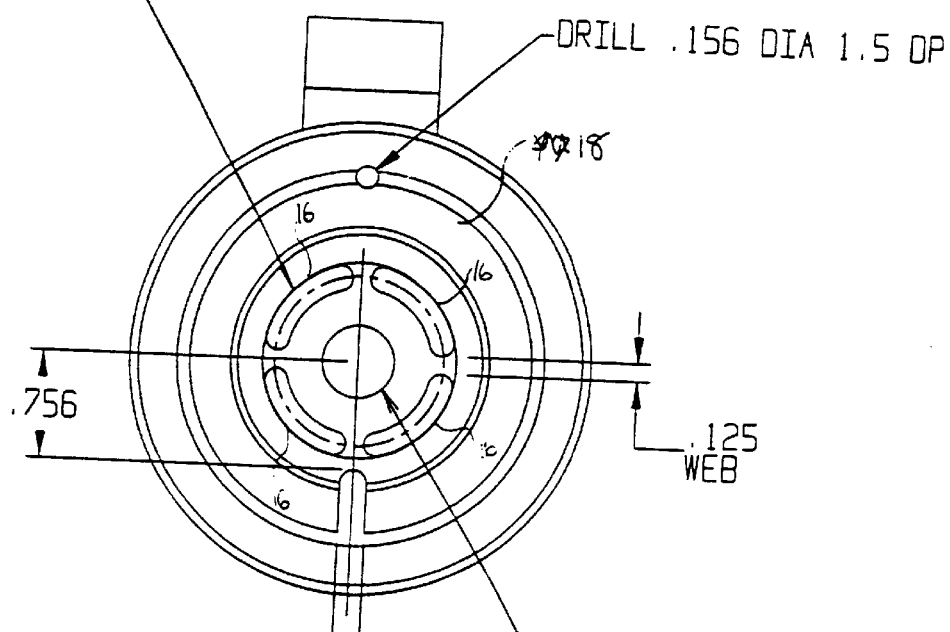

FIG. 18 is a bottom perspective drawing with dimensions illustrating how the four oblong liquid discharge outlets 16 are machined. First of all (and with further reference to FIG. 12), the bottom of the valve housing is chamfered inwardly to form a 1.712" diameter discharge lip 18. Discharge lip 18 flares outward from the four oblong liquid discharge outlets 16. The four liquid discharge outlets 16 are evenly disposed about the gas discharge tube 3 just inside the lip 18. The liquid discharge outlets 16 are each a 0.165" wide oblong slot, and they are equally spaced about a 1.179" circumference from the center. This particular arrangement of oblong slots with chamfered lip 18 evenly disperses liquid down and around the margins of lip 18, and the need for costly valve tips is eliminated.

Figure 19:
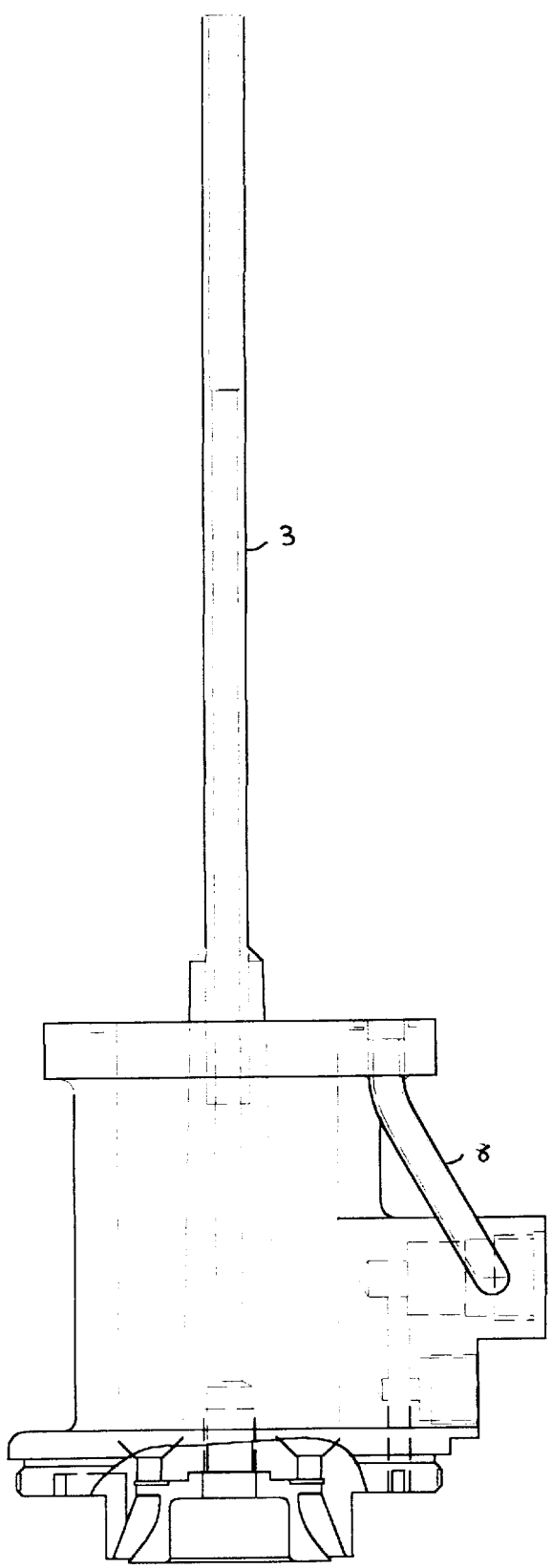

FIG. 19 is a side cross-section of the completed valve housing 2 illustrating the addition of the stainless tube 8 by press-fitting into the pre-drilled flange 4 and welding at the other end to the side-aperture 43 in port block 6. In addition, a conventional gas discharge tube 3 is press-fit into the neck 10 of valve body 2. Both of these are conventional components and are added in a conventional manner.

The primary steps of the above-described manufacturing process combine to eliminate the need for separate machining and welding together of the cylindrical mid-section, port block section, and valve cap section as previously necessary with prior art valve bodies. The essence of the process is the lathing of steel bar stock to form a plurality of annular tiers at least including an upper tier corresponding to the upward flange 4 and a lower tier corresponding to the port block section 11 protruding from the mid-section 2, and then machining and reducing a major angular extent of the lower tier to leave the port block section 11 protruding from the mid-section 2. In the further context of all steps necessary to manufacture a completed valve body, the process includes nine primary steps, including a first exterior lathing step (previously described with respect to FIG. 10) in which a solid cylindrical stainless bar stock is lathed to form an annular channel leaving a round lower mass 26 of sufficient diameter to form port blocks 6 and 7 plus bottom flange 12, and an annular upper mass for forming flange 4. A second drilling step is completed to form reservoir 14 and upwardly protruding neck 10 (previously described with respect to FIG. 11-12). A third step is another boring operation to drill a passage through neck 10. A fourth step involves further external lathing (previously described with respect to FIG. 13, in which the lathing of four annular tiers 42, 44, 46 and 48 subdivide the bottom mass. A fifth step is the external cutting and finishing process (previously described with respect to FIGS. 14, 15) by which the external dimensions of the valve 2 and port block section 11 are defined. Here, the lathed tiers 42 and 44 are machined around approximately 330 degrees to leave the rectangular port blocks 6 and 7. The next and sixth drilling step to port blocks 6, 7 results in pre-drilling and threading (FIG. 16). The seventh step completes the flange 4 (FIG. 17). The eighth step completes the outlet end 13 by champfering lip 18 and machining four oblong liquid discharge outlets 16. Finally, the ninth step completes the valve housing 2, and this involves adding the stainless tube 8 by press-fitting into the pre-drilled flange 4 and is welded at the other end to the side-aperture in port block 6. In addition, a conventional gas discharge tube 3 is press-fit into the neck 10 of valve body 2.

The above-described manufacturing process for a weldless and tipless valve housing is much simpler and results in a more cost-effective end product. Moreover, the absence of weld lines reduces breakage and bacterial contamination. Of course, the sequence of above-described steps may vary.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the following claims.

I claim:

1. A process for manufacturing a valve body for a counter-pressure filling machine from a single piece of bar stock, including the following steps:

a first exterior lathing step in which a solid cylindrical stainless bar stock is lathed to form a cylindrical upper flange, mid-section, and lower mass;

a second drilling step along an axis of the bar stock to form a central reservoir with an upwardly protruding neck;, a third drilling step to drill a counter-pressure gas passage through the neck;

a fourth exterior lathing step to form a plurality of annular tiers along the lower mass;

a fifth machining step of reducing one of said annular tiers to said mid-section to leave a port block section protruding from said mid-section;

a sixth drilling step to form a pair of threaded couplings in said port block section;

a seventh machining step to adapt said flange for connection to an existing filling machine; and an eighth step of chamfering the lower mass to form a frustro-conical outlet end with a plurality of oblong liquid discharge outlets in fluid communication with said reservoir.

2. The process for manufacturing a valve body from a single piece of bar stock according to claim 1, further comprising a ninth step of coupling a tube between said upper flange and said port block section.

3. The process for manufacturing a valve body from a single piece of bar stock according to claim 2, further comprising a step of press-fitting a counter-pressure gas tube into said neck.

4. A valve body for a counter-pressure filling machine manufactured in accordance with the process described in claim 1.

* * * * *